United States Patent
Takeda et al.

(10) Patent No.: US 12,156,203 B2
(45) Date of Patent: Nov. 26, 2024

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 537 days.

(21) Appl. No.: 17/420,607

(22) PCT Filed: Jan. 11, 2019

(86) PCT No.: PCT/JP2019/000791
§ 371 (c)(1),
(2) Date: Jul. 2, 2021

(87) PCT Pub. No.: WO2020/144869
PCT Pub. Date: Jul. 16, 2020

(65) Prior Publication Data
US 2022/0086882 A1    Mar. 17, 2022

(51) Int. Cl.
*H04W 72/1273* (2023.01)
*H04W 72/044* (2023.01)
*H04W 72/23* (2023.01)

(52) U.S. Cl.
CPC ..... *H04W 72/1273* (2013.01); *H04W 72/044* (2013.01); *H04W 72/23* (2023.01)

(58) Field of Classification Search
CPC .......... H04W 72/1273; H04W 72/044; H04W 72/23; H04L 5/0044; H04L 5/0096; H04L 5/001
See application file for complete search history.

(56) References Cited

U.S. PATENT DOCUMENTS

| | | | |
|---|---|---|---|
| 2018/0048994 A1 | 2/2018 | Kwon et al. | |
| 2019/0215117 A1* | 7/2019 | Lee | H04L 5/0078 |
| 2019/0222349 A1* | 7/2019 | Gao | H04W 72/20 |
| 2020/0184686 A1* | 6/2020 | Jung | G01C 21/367 |
| 2021/0014881 A1* | 1/2021 | Aiba | H04L 1/1822 |
| 2021/0204262 A1* | 7/2021 | Xu | H04L 5/0098 |

OTHER PUBLICATIONS

Office Action in the counterpart Chinese Application No. 201980092433.5, mailed May 31, 2023 (14 pages).
(Continued)

*Primary Examiner* — Ashley Shivers
(74) *Attorney, Agent, or Firm* — Osha Bergman Watanabe & Burton LLP

(57) ABSTRACT

A user terminal includes a receiving section that receives, in a first cell, first downlink control information indicating that configuration of configured grant type 2 or downlink Semi-Persistent Scheduling (DL SPS) of a second cell or a specific Bandwidth Part (BWP) is to be activated, and receives second downlink control information, and a control section that considers that the configuration is to be deactivated, based on a value of a specific field in the second downlink control information. According to an aspect of the present disclosure, configured grant or DL SPS can be appropriately controlled by using downlink control information.

4 Claims, 7 Drawing Sheets

VALUES OF SPECIAL FIELDS IN DEACTIVATION DCI

| SPECIAL FIELD | VALUE IN DCI FORMAT 0_1 OR DCI FORMAT 1_1 |
|---|---|
| HARQ PROCESS NUMBER | ALL "0" |
| RV | "00" |
| MCS | ALL "1" |
| FREQUENCY DOMAIN RESOURCE ASSIGNMENT | • IN CASE WHERE ONLY RA TYPE 0 IS CONFIGURED: ALL "0"<br><br>• IN CASE WHERE ONLY RA TYPE 1 IS CONFIGURED: ALL "1"<br><br>• IN CASE WHERE DYNAMIC SWITCHING IS CONFIGURED: ALL "0" IN CASE WHERE MSB IS "0" OTHERWISE ALL "1" |

(56) References Cited

OTHER PUBLICATIONS

Vivo: "Discussion on the activation/deactivation of the bandwidth part", 3GPP TSG RAN WG1 Meeting#90, R1-1712870, Prague, Czech Republic, Aug. 21-25, 2017 (3 pages).
International Search Report issued in PCT/JP2019/000791 on Apr. 9, 2019 (1 page).
Written Opinion of the International Searching Authority issued in PCT/JP2019/000791 on Apr. 9, 2019 (4 pages).
NTT Docomo, Inc .; "UL data transmission procedure"; 3GPP TSG RAN WG1 Meeting #93, R1-1807068; Busan, Korea; May 21-25, 2018 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Vivo, "Remaining details for bandwidth part operation" 3GPP TSG RAN WG1 NR AH#3, R1-1715648, Nagoya, Japan, Sep. 18-21, 2017 (3 pages).
Extended European Search Report issued in European Application No. 19908185.2 mailed on Jul. 15, 2022 (10 pages).

* cited by examiner

VALUES OF SPECIAL FIELDS IN ACTIVATION DCI

| SPECIAL FIELD | VALUE IN DCI FORMAT 0_0 OR DCI FORMAT 0_1 | VALUE IN DCI FORMAT 1_0 | VALUE IN DCI FORMAT 1_1 |
|---|---|---|---|
| HARQ PROCESS NUMBER | ALL "0" | ALL "0" | ALL "0" |
| RV | "00" | "00" | "00" FOR ENABLED TRANSPORT BLOCK(S) |

FIG. 1

VALUES OF SPECIAL FIELDS IN DEACTIVATION DCI

| SPECIAL FIELD | VALUE IN DCI FORMAT 0_0 OR DCI FORMAT 0_1 | VALUE IN DCI FORMAT 1_0 |
|---|---|---|
| HARQ PROCESS NUMBER | ALL "0" | ALL "0" |
| RV | "00" | "00" |
| MCS | ALL "1" | ALL "1" |
| FREQUENCY DOMAIN RESOURCE ASSIGNMENT | ALL "1" | ALL "1" |

FIG. 2

VALUES OF SPECIAL FIELDS IN DEACTIVATION DCI

| SPECIAL FIELD | VALUE IN DCI FORMAT 0_1 OR DCI FORMAT 1_1 |
|---|---|
| HARQ PROCESS NUMBER | ALL "0" |
| RV | "00" |
| MCS | ALL "1" |
| FREQUENCY DOMAIN RESOURCE ASSIGNMENT | • IN CASE WHERE ONLY RA TYPE 0 IS CONFIGURED: ALL "0"<br>• IN CASE WHERE ONLY RA TYPE 1 IS CONFIGURED: ALL "1"<br>• IN CASE WHERE DYNAMIC SWITCHING IS CONFIGURED: ALL "0" IN CASE WHERE MSB IS "0" OTHERWISE ALL "1" |

FIG. 3

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE system (for example, LTE Rel. 8 to Rel. 14), a user terminal (User Equipment (UE)) controls reception of a downlink shared channel (for example, Physical Downlink Shared Channel (PDSCH)), based on downlink control information (DCI, also referred to as DL assignment and so on) communicated through a downlink control channel (for example, Physical Downlink Control Channel (PDCCH). The user terminal controls transmission of an uplink shared channel (for example, Physical Uplink Shared Channel (PUSCH)), based on DCI (also referred to as UL grant and so on).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For NR, studies have been conducted about scheduling using dynamic grant and scheduling using configured grant. Studies have also been conducted about scheduling, based on downlink control information regarding one cell or one bandwidth part (BWP), of another cell or BWP.

However, control of configured grant for another cell or BWP is not clear. A similar problem may also occur when semi-persistent scheduling (SPS) of a downlink shared channel (PDSCH (Physical Downlink Shared Channel) in a downlink (DL) is applied.

Thus, an object of the present disclosure is to provide a user terminal and a radio communication method that appropriately control configured grant or DL SPS by using downlink control information.

Solution to Problem

A user terminal according to an aspect of the present disclosure includes a receiving section that receives, in a first cell, first downlink control information indicating that configuration of configured grant type 2 or downlink Semi-Persistent Scheduling (DL SPS) of a second cell or a specific Bandwidth Part (BWP) is to be activated, and receives second downlink control information, and a control section that considers that the configuration is to be deactivated, based on a value of a specific field in the second downlink control information.

Advantageous Effects of Invention

According to an aspect of the present disclosure, configured grant or DL SPS can be appropriately controlled by using downlink control information.

BRIEF DESCRIPTION OF DRAWINGS

FIG. 1 is a diagram to show an example of special fields for a check for an activation PDCCH for DL SPS and configured grant type 2 in Rel. 15;

FIG. 2 is a diagram to show an example of special fields for a check for a deactivation PDCCH for DL SPS and configured grant type 2 in Rel. 15;

FIG. 3 is a diagram to show an example of special fields for a check for the deactivation PDCCH for DL SPS and configured grant type 2;

DESCRIPTION OF EMBODIMENTS

Figure 4:
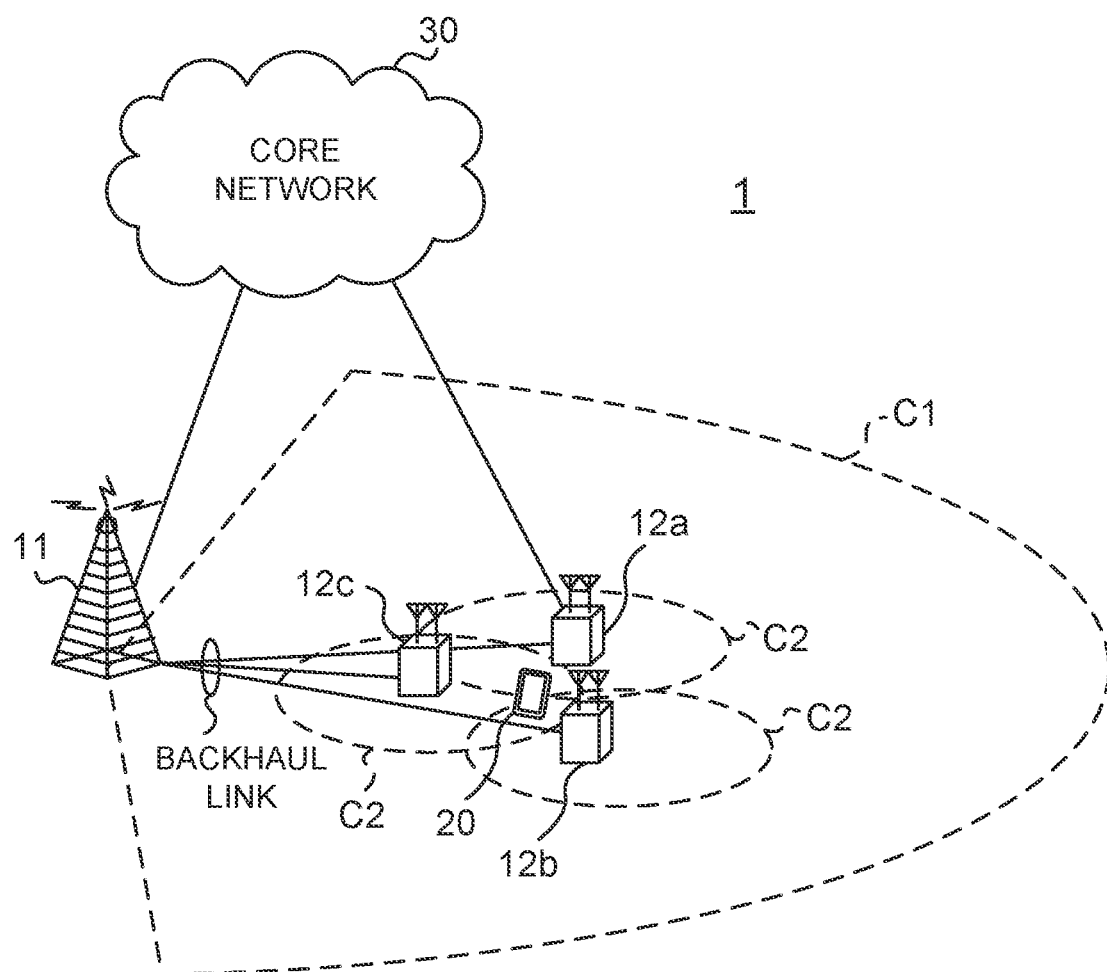
FIG. 4 is a diagram to show an example of a schematic structure of a radio communication system according to one embodiment.

<Dynamic Grant-Based Transmission and Configured Grand-Based Transmission (Type 1, Type 2)>

For NR, studies have been conducted about dynamic grant-based transmission and configured grant-based transmission.

The dynamic grant-based transmission is UL transmission using an uplink shared channel (for example, a PUSCH (Physical Uplink Shared Channel)) based on downlink control information (DCI) (UL grant) or DL transmission using a downlink shared channel (for example, a PDSCH (Physical Downlink Shared Channel)) based on DCI (DL assignment).

The configured grant-based transmission is UL transmission using an uplink shared channel (for example, a PUSCH) based on configuration information (which may be referred to as, for example, configured grant, configured UL grant, and so on) configured by a higher layer or DL transmission using a downlink shared channel (for example, a PDSCH) based on configuration information (for example, sps-config) configured by a higher layer.

In the configured grant-based transmission, the UE has already been allocated a UL resource and can hence voluntarily perform UL transmission by using the resource configured, allowing implementation of low-delay communication to be expected.

The dynamic grant-based transmission may be referred to as a dynamic grant-based PUSCH, UL transmission with dynamic grant, a PUSCH with dynamic grant, UL transmission with UL grant, UL grant-based transmission, UL transmission scheduled by dynamic grant (configured with transmission resource), and so on.

The configured grant-based transmission may be referred to as a configured grant-based PUSCH, UL transmission with configured grant, a PUSCH with configured grant, UL transmission without UL grant, UL grant-free transmission, UL transmission scheduled by configured grant (configured with transmission resource), and so on.

The configured grant-based DL transmission may be referred too as semi-persistent scheduling (SPS). The configured grant-based UL transmission may be referred to as UL SPS. In the present disclosure, "configured grant" may be interchangeably interpreted with "SPS," "SPS/configured grant," and so on.

For configured grant-based transmission, several types (type 1, type 2, and so on) have been under study.

Parameters for the configured grant type 1 transmission (type 1 configured grant) (the parameters may be referred to as configured grant-based transmission parameters, configured grant parameters, type 1 configured grant parameters, and so on) may be configured for the UE by using higher layer parameters instead of using downlink control information (DCI).

For example, the type 1 configured grant parameters may be configured by using at least one of configured grant configuration information (for example, an RRC information element "ConfiguredGrantConfig") and PUSCH configuration information (for example, an RRC control element "pusch-Config").

The configured grant configuration information for type 1 may include configured uplink grant (for example, an RRC control element "rrc-ConfiguredUplinkGrant"). The configured grant configuration information may include, for example, information related to at least one of frequency hopping, a demodulation reference signal (DMRS), a modulation and coding scheme (MCS) table, whether or not transform precoding is applied, the number of HARQ processes, the number of repetitions, a redundancy version (RV) sequence used for repeated transmission, and period.

The configured uplink grant may include, for example, information related to at least one of a time domain offset, time domain allocation, frequency domain allocation, an antenna port, DMRS initialization, an SRS (Sounding Reference Signal) resource identifier, an MCS, a transport block size, frequency hopping offset, and a path loss reference index.

Parameters for the configured grant type 2 transmission (type 2 configured grant) (the parameters may be referred to as configured grant-based transmission parameters, configured grant parameters, type 2 configured grant parameters, and so on) may be configured for the UE by using DCI and higher layer parameters.

For example, the type 2 configured grant parameters may be configured by using at least one of configured grant configuration information (for example, the RRC information element "ConfiguredGrantConfig"), PUSCH configuration information (for example, an RRC control element "pusch-Config"), and DCI including CRC (Cyclic Redundancy Check) bits scrambled with a specific RNTI (for example, a CS-RNTI (Configured Scheduling Radio Network Temporary Identifier) or to which the CRC bits are added (CRC-scrambled).

The configured grant configuration information for type 2 need not include the above-described configured uplink grant (for example, an RRC control element "rrc-ConfiguredUplinkGrant"). At least one of the pieces of information included in the configured uplink grant may be included in the DCI scrambled with the specific RNTI (for example, the CS-RNTI).

The configured grant configuration information for type 2 may include, for example, information related to at least one of the frequency hopping, the demodulation reference signal (DMRS), the modulation and coding scheme (MCS) table, whether or not transform precoding is applied, the number of HARQ processes, the number of repetitions, the redundancy version (RV) sequence used for repeated transmission, and the period.

In a case where one or a plurality of pieces of configured grant configuration information for type 1 are configured, the UE may determine that one or a plurality of configured grant type 2 transmissions are triggered. The UE may control the PUSCH transmission without dynamic grant by using a resource (which may be referred to as a configured grant resource, a transmission occasion, and so on) configured by the configured grant configuration information for type 1. Note that even in a case where the configured grant-based transmission is configured, the UE may skip the configured grant-based transmission in a case where a transmission buffer contains no data.

In a case where one or a plurality of pieces of configured grant configuration information for type 2 are configured, and where DCI for activation is received, the UE may determine that one or a plurality of configured grant type 2 are triggered or activated. DCI for the activation may be DCI scrambled with the specific RNTI (for example, the CS-RNTI) (for example, DCI format 0_0 or 0_1). The DCI may be used for control of deactivation, retransmission, and the like of the configured grant.

For example, in a case of receiving the activation DCI of the configured grant type 2, the UE may control the PUSCH transmission by using a resource specified by the configured grant configuration information for type 2 and parameters in the activation DCI (for example, at least one of the time domain offset, the time domain allocation, the frequency domain allocation, the antenna port, DMRS initialization, the SRS resource identifier, the MCS, the transport block size, the frequency hopping offset, and the path loss reference index.

Based on DCI deactivating the configured grant type 2 transmission or expiration of a certain timer (elapse of a certain time), the UE may perform release (which may be referred to as deactivation and so on) of a resource (PUSCH) corresponding to the configured grant type 2 transmission. Note that even in a case where the configured grant type 2 transmission is activated (is in an active state), the UE may skip the configured grant-based transmission in a case where the transmission buffer contains no data.

The PUSCH configuration information used for configuration of configured grant type 1 or 2 may include information related to at least one of information related to an identifier (dataScramblingIdentityPUSCH) used to scramble initial data for the PUSCH, a transmission configuration (for example, a codebook base or a non-codebook base), a codebook subset, a maximum rank, and UCI on PUSCH, and information (p-pi2BPSK) related to a modulation scheme applied to transform precoding.

<DL SPS>

For the UE, for example, a periodic resource for downlink (DL) Semi-Persistent Scheduling (SPS) may be configured through higher layer signaling (for example, SPS configuration information, SPS-Config), and at least one of transmission and reception using this resource may be activated or released (deactivated) by downlink control information (DCI) reported by using a PDCCH.

The PDCCH (DCI) for activation or deactivation of DL SPS may include a CRC (Cyclic Redundancy Check) scrambled with an RNTI for SPS. The RNTI for SPS may be referred to as a CS-RNTI (Configured Scheduling RNTI).

<Frequency Domain Resource Assignment>

In a case where for the UE, only resource allocation (RA) type 0 is configured for the PUSCH through higher layer signaling, a frequency domain resource assignment field in DCI format 0_1 may be represented by a bit map using units of certain frequency resources (for example, resource block groups (RBGs)).

In a case where for the UE, only RA type 1 is configured for the PUSCH through higher layer signaling, the frequency domain resource assignment field in DCI format 0_1 may be represented by Resource Indication Values (RIVs) indicating the start position and length of consecutive frequency resources, by using units of certain frequency resources (for example, PRBs).

The units of frequency resources may be any of PRBs, RBGs, and sub-carrier groups (SCGs).

In a case where, for the UE, dynamic switching between RA type 0 and RA type 1 is configured for the PUSCH through higher layer signaling, the MSB (Most Significant Bit) of the frequency domain resource assignment field in DCI format 0_1 may indicate the RA type. With dynamic switching configured, in a case where the MSB of the frequency domain resource assignment field is 0, the remaining bits of the frequency domain resource assignment field may indicate a frequency resource by RA type 0. With dynamic switching configured, in a case where the MSB of the frequency domain resource assignment field is 1, the remaining bits of the frequency domain resource assignment field may indicate a frequency resource by RA type 1.

A frequency assignment field in DCI format 1_1 may be similar to a frequency allocation field in DCI format 1_0. For the UE, an RA type for the PDSCH may be configured through higher layer signaling.

<Activation/Deactivation>

Rel. 15 specifies special fields via which the UE checks for activation signaling (activation DCI) and deactivation signaling (deactivation DCI) of DL SPS and configured grant type 2 (uplink (UL) grant type 2 scheduling).

FIG. 1 is a diagram to show an example of special fields for a check for an activation PDCCH for DL SPS and configured grant type 2 in Rel. 15.

One of DCI formats 0_0, 0_1, 1_0, and 1_1 is used for activation of DL SPS and configured grant type 2.

The special fields in activation DCI may be an HARQ process number and a redundancy version (RV).

The values of the special fields may be set to special values (for example, invalid values).

The special value of the HARQ process number may be all 0. The special value of the RV in DCI formats 0_0, 0_1, and 1_0 may be 00. The special value of the RV in DCI format 1_1 may be 00 for an enabled transport block(s).

The UE receives one of DCI formats 0_0, 0_1, 1_0, and 1_1 including special fields with special values as shown in FIG. 1 and considers that DL SPS and configured grant type 2 are to be activated.

FIG. 2 is a diagram to show an example of special fields for a check for deactivation PDCCH for DL SPS and configured grant type 2 in Rel. 15.

For suppression of signaling overhead, DCI format 0_0 or 1_0 (also referred to as fallback DCI) is preferably used as deactivation DCI.

For a reduced false alarm rate, at least two special fields preferably have a value varying between activation DCI and deactivation DCI. Special fields for deactivation DCI may include a modulation and coding scheme (MCS) and frequency domain resource assignment in addition to the HARQ process number and the RV, which are also included in the special fields for activation.

The special value of the HARQ process number may be all 0. The special value of the RV may be 00. The special value of the MCS may be all 1. The special value of the frequency domain resource assignment may be all 1.

The UE receives one of DCI formats 0_0 and 1_0 including special fields with special values as shown in FIG. 2 and considers that DL SPS and configured grant type 2 are to be deactivated.

In other words, activation of configured grant type 2 is performed only by DCI format 0_0 or 0_1, whereas deactivation of configured grant type 2 is performed only by DCI format 0_0.

DCI format 1_1 or 0_1 includes a carrier indicator field (CIF) and a bandwidth part (BWP)) indicator field. Thus, activation of DL SPS and configured grant type 2 using DCI format 1_1 or 0_1 supports activation of a carrier (cross carrier) different from a carrier for DCI (component carrier (CC) or cell) or a BWP (cross BWT) different from a BWP for DCI.

In a case where cross carrier scheduling and configured grant type 2 are configured for the UE, activation of cross carrier configured grant type 2 can be performed by using DCI format 0_1 as activation DCI and using the CIF in DCI format 0_1. For example, the CIF in DCI format 0_1 for a cell to be scheduled (scheduling cell, the cell in which DCI is transmitted) specifies a scheduled cell (the cell which scheduled data (PUSCH or PDSCH) is transmitted), allowing the configured grant type 2 of the scheduled cell to be activated.

The scheduled cell may include a scheduling cell (may be a scheduled cell of cross carrier scheduling of self carrier scheduling) or need not include a scheduling cell (may be a scheduled cell of cross carrier scheduling).

As described above, even in a case where cross carrier configured grant type 2 is activated, the lack of the CIF in DCI format 0_0 used for deactivation prevents configured grant type 2 from being deactivated by using the scheduling cell to specify the scheduled cell.

Similarly, in a case where configured rant type 2 is configured for the UE, activation of cross BWP configured grant type 2 can be performed by using DCI format 1_1 as activation DCI and using a BWP indicator field in DCI format 1_1. On the other hand, the lack of the BWP indicator field in DCI format 0_0 used for deactivation prevents configured grant type 2 from being deactivated by using a scheduling BWP to specify a scheduled BWP.

Similarly, in a case where cross carrier scheduling and DL SPS are configured for the UE, activation of cross carrier DL SPS can be performed by using DCI format 1_1 as activation DCI and using the CIF in DCI format 1_1. On the other hand, the lack of the CIF in DCI format 1_0 used for deactivation prevents DL SPS from being deactivated by using the scheduling cell to specify the scheduled cell.

Similarly, in a case where configured grant type 2 is configured for the UE, activation of cross BWP DL SPS can be performed by using DCI format 1_1 as activation DCI and using a BWP indicator field in DCI format 1_1. On the other hand, the lack of the BWP indicator field in DCI format 1_0 used for deactivation prevents DL SPS from being deactivated by using a scheduling BWP to specify a scheduled BWP.

As described above, it is not clear whether deactivation of cross carrier and cross BWP is supported and how deactivation of cross carrier and cross BWP is performed.

Thus, the inventors of the present invention came up with the idea that a UK receives, in a first cell, first downlink control information indicating that configuration of configured grant type 2 or downlink Semi-Persistent Scheduling (DL SPS) of a second cell or a specific BWP is to be activated, receives second downlink control information, and considers that the configuration is to be deactivated, based on values of specific fields in the second downlink control information.

Embodiments according to the present disclosure will be described in detail with reference to the drawings as follows. The embodiments may be employed independently or may be employed in combination.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (CE), a MAC Protocol Data Unit (PDU), or the like. The broadcast information may be, for example, a master information block (MID), a system information block (SIB), minimum system information (Remaining Minimum System information (RMSI)), other system information (OSI), or the like.

(Radio Communication Method)

Embodiment 1

The UE may be indicated by a DCI format including at least one of the CIF and the BWP indicator field (DCI format 0_1 or 1_1), to deactivate configured grant type 2 or DL SPS.

In each of DCI formats 0_1 and 1_1 for deactivation, the special fields may indicate the special values.

FIG. 3 is a diagram to show an example of special fields for a check for a deactivation PDCCH for DL SPS and configured grant type 2.

The special fields in DCI formats 0_1 and 1_1 may include at least one of the HARQ process number, the RV, the MCI, and the frequency domain resource assignment.

The special value of the HARQ process number may be all 0. The special value of the RV may be 00. The special value of the MCS may be all 1.

The special value of the frequency domain resource assignment may be based on the RA type.

In a case where for the UE, only RA type 0 is configured for the PUSCH (configured grant type 2) or the PDSCH (DL SPS) through higher layer signaling, all the bits constituting the frequency domain resource assignment field in DCI format 0_1 or 1_1 for deactivation may be configured to "0." Note that in a case where only RA type 0 is configured, not all the its in the frequency domain resource assignment field in DCI format 0_1 or 1_1 for data scheduling or activation are configured to "0."

In a case where for the UE, only RA type 1 is configured for the PUSCH (configured grant type 2) or the PDSCH (DL SPS) through higher layer signaling, the frequency domain resource assignment field in DCI format 0_1 or 1_1 for deactivation may all be configured to "1." Note that in a case where only RA type 1 is configured, not all the bits in the frequency domain resource assignment field in DCI format 0_1 or 1_1 for data scheduling or activation are configured to "1."

In a case where for the UE, dynamic switching between RA type 0 and RA type 1 is configured for the PUSCH (configured grant type 2) or the PDSCH (DL SPS) through higher layer signaling and where the MSB of the frequency domain resource assignment field in DCI format 0_1 or 1_1 for deactivation is configured to 0, the remaining bits in the frequency domain resource assignment field may all be configured to "0." Note that in a case where dynamic switching is configured and where the MSB of the frequency domain resource assignment field in DCI format 0_1 or 1_1 is configured to 0, not all the bits in the frequency domain resource assignment field in DCI format 0_1 or 1_1 for data scheduling or activation are configured to "0."

In a case where for the UE, dynamic switching is configured for the PUSCH (configured grant type 2) or the PDSCH (DL SPS) through higher layer signaling and where the MSB of the frequency domain resource assignment field in DCI format 0_1 or 1_1 for deactivation is configured to 1, the remaining bits in the frequency domain resource assignment field may all be configured to "1." Note that in a case where dynamic switching is configured and where the MSB of the frequency domain resource assignment field in DCI format 0_1 or 1_1 is configured to 1, not all the bit in the frequency domain resource assignment field in DCI format 0_1 or 1_1 for data scheduling or activation are configured to "1."

In a case where the special fields in DCI format 0_1 or 1_1 indicate the special values, the UE may consider that the DCI corresponds to deactivation DCI. Operations will be described below that are performed in a case where deactivation DCI is received.

<<Configured Grant Type 2>>

With cross carrier scheduling configured, with configured grant type 2 configured for at least one scheduled cell, and with the configured grant type 2 activated, in a case of receiving DCI format 0_1 for deactivation in the scheduling cell, the UE may consider that configured grant type 2 of the scheduled cell indicated by the CIF in the DCI is to be deactivated.

With configured grant type 2 configured for at least one BWP and with the configured grant type 2 activated, in a case of receiving DCI format 0_1 for deactivation, the UE may consider that configured grant type 2 of the BWP indicated by the BWP indicator field in the DCI is to be deactivated.

<<DL SPS>>

With cross carrier scheduling configured, with DL SPS configured for at least one scheduled cell, and with the DL SPS activated, in a case of receiving DCI format 1_1 for deactivation in the scheduling cell, the UE may consider that configured grant type 2 of the scheduled cell indicated by the CIF in the DCI is to be deactivated.

With DL SPS configured for at least one BWP and with the DL SPS activated, in a case of receiving DCI format 1_1 for deactivation, the UE may consider that the DL SPS of the BWP indicated by the BWP indicator field in the DCI is to be deactivated.

According to Embodiment 1 described above, deactivation of at least one of cross carrier and cross BWP can be performed for configured grant type 2 or DL SPS.

Embodiment 2

One DCI format 0_0 or 1_0 in one cell may deactivate configured grant type 2 or DL SPS of at least one of the scheduled cell and the BWP that may be scheduled by using the one cell.

The special fields in DCI format 0_0 or 1_0 for deactivation may have the special values in FIG. 2.

Configured Grant Type 2

With cross carrier scheduling configured, with configured grant type 2 configured for at least one scheduled cell, and with the configured grant type 2 activated, in a case of receiving DCI format 0_0 for deactivation in the scheduling cell, the UE may consider that configured grant type 2 of each of all the scheduled cells that may be scheduled by using the scheduling cell is to be deactivated.

With configured grant type 2 configured for at least one BWP and with the configured grant type 2 activated, in a case of receiving DCI format 0_0 for deactivation, the UE may consider that configured grant type 2 of all the BWPs is to be deactivated.

<<DL SPS>>

With cross carrier scheduling configured, with DL SPS configured for at least one scheduled cell, and with the DL SPS activated, in a case of receiving DCI format 1_0 for deactivation in the scheduling cell, the UE may consider that the DL SPS of each of all the scheduled cells that may be scheduled by using the scheduling cell is to be deactivated.

With DL SPS configured for at least one BWP and with the DL SPS activated, in a case of receiving DCI format 1_0 for deactivation, the UE may consider that the DL SPS of each of all the BWPs is to be deactivated.

According to Embodiment 2 described above, deactivation of at least one of cross carrier and cross BWP can be performed for configured grant type 2 or DL SPS. The use of DCI format 0_0 or 1_0 for deactivation allows signaling overhead to be suppressed.

Embodiment 3

The maximum number of scheduled cells or one BWP for which configured grant type 2 or DL SPS is configured may be limited to 1. DCI format 0_0 or 1_0 may deactivate configured grant type 2 or DL SPS of one scheduled cell or one BWP.

The special fields in DCI format 0_0 or 1_0 for deactivation may have the special values in FIG. 2.

<<Configured Grant Type 2>>

In a case where cross carrier scheduling is configured, the UK may assume that configured grant type 2 is configured for at most one scheduled cell included in the cells (scheduled cells) that may be scheduled by using one scheduling cell.

With cross carrier scheduling configured, with configured grant type 2 configured for one scheduled cell, and with the configured grant type 2 activated, in a case of receiving DCI format 0_0 for deactivation, the UE may consider that the configured grant type 2 configured for the scheduled cell is to be deactivated.

The UE may assume that configured grant type 2 is configured for at most one BWP.

With configured grant type 2 configured for one BWP and with the configured grant type 2 activated, in a case of receiving DCI format 0_0 for deactivation, the UE may consider that the configured grant type 2 configured for the BWP is to be deactivated.

<<DL SPS>>

In a case where cross carrier scheduling is configured, the UK may assume that DL SPS is configured for at most one scheduled cell included in the cells (scheduled cells) that may be scheduled by using one scheduling cell.

With cross carrier scheduling configured, with DL SPS configured for one scheduled cell, and with the DL SPS activated, in a case of receiving DCI format 1_0 for deactivation, the UE may consider that the DL SPS configured for the scheduled cell is to be deactivated.

The UK may assume that SPS is configured for at most one BWP.

With DL SPS configured for one EWP and with the DL SPS activated, in a case of receiving DCI format 1_0 for deactivation, the UE may consider that the DL SPS configured for the END is to be deactivated.

According to Embodiment 3 described above, deactivation of at least one of cross carrier and cross END can be performed for configured grant type 2 or DL SPS. The use of DCI format 0_0 or 1_0 for deactivation allows signaling overhead to be suppressed.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eND) of LTE (E-UTRA) is an SN.

The radio communication system 1 may support dual connectivity between a plurality of base stations in the same RAT (for example, dual connectivity (NR-NR Dual Connectivity (NM-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LIE, LTE-A, 5G, and so on.

In the radio communication system 1, an orthogonal frequency division multiplexing (OFDM)-based wireless access scheme may be used. For example, least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred o as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
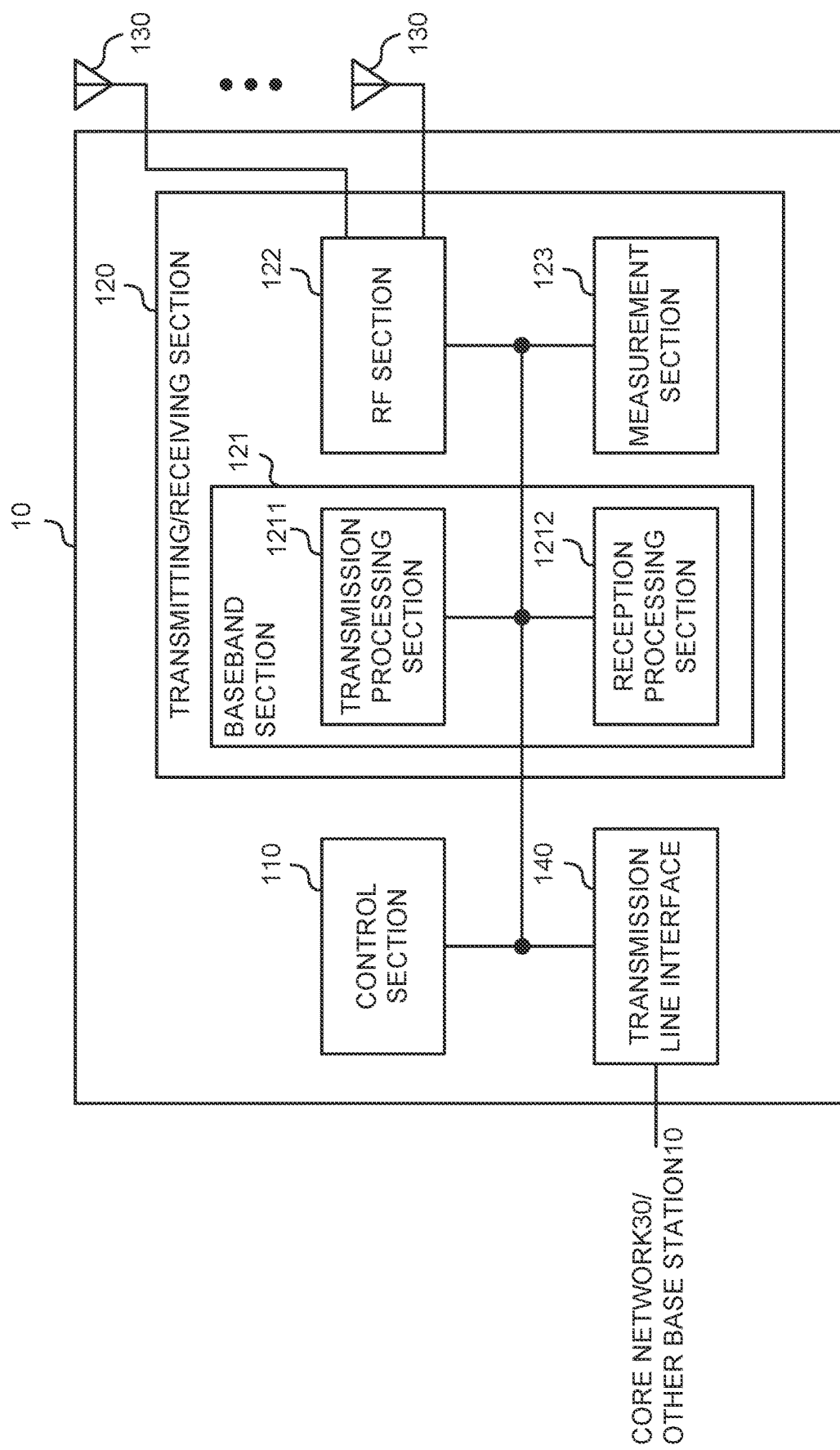
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MaC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing or the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (REM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120 and the transmitting/receiving antennas 130.

(User Terminal)

Figure 6:
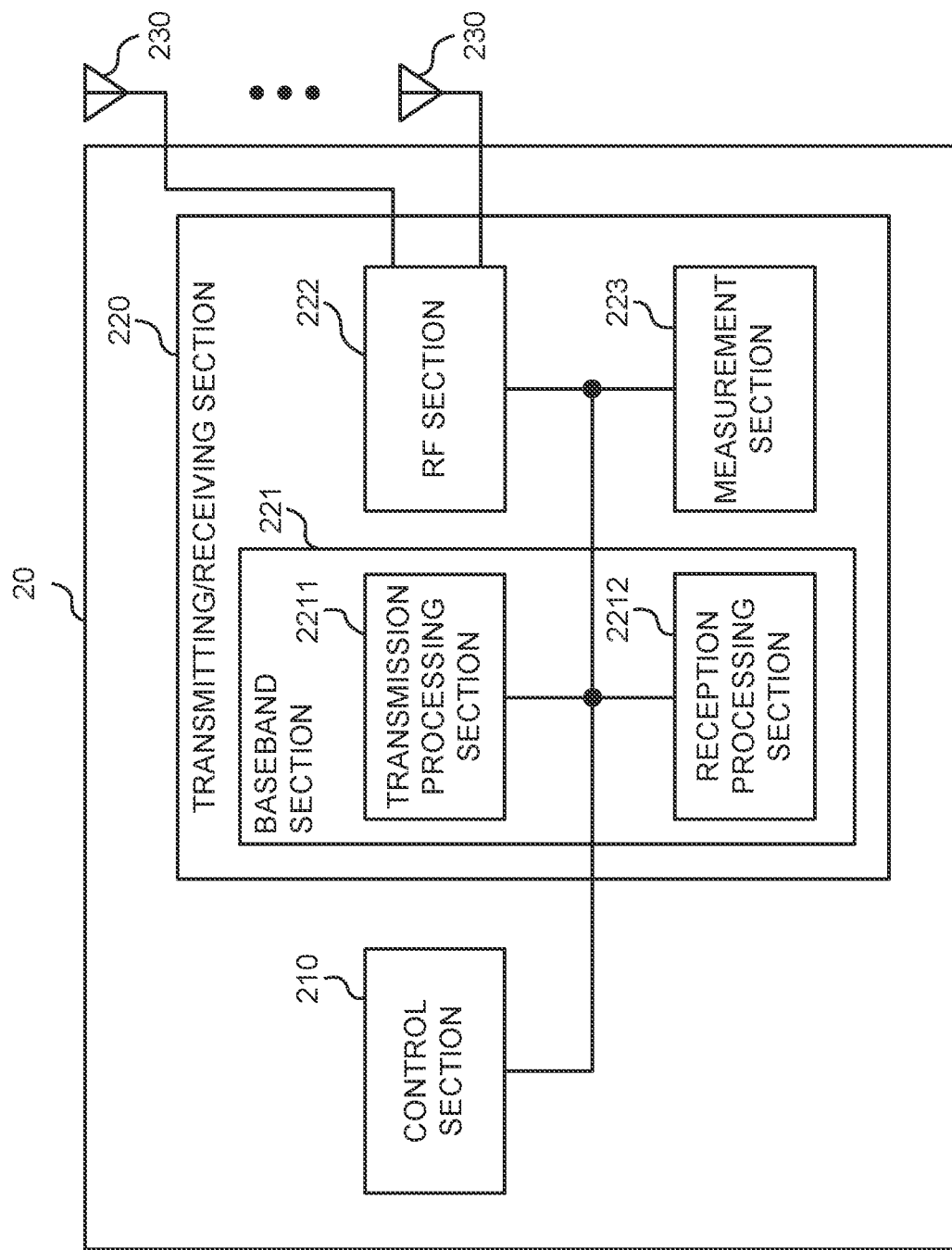
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing, of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The transmitting/receiving section 220 may receive, in a first cell (scheduling cell), first downlink control information indicating that configuration of configured grant type 2 or downlink Semi-Persistent Scheduling (DL SPS) of a second cell (scheduled cell) or a specific Bandwidth Part (BWP) is to be activated, and receive second downlink control information. The control section 210 may consider that the configuration is to be deactivated, based on the value of the specific field (for example, a special field, a carrier indicator field, a BWP indicator field, or the like) in the second downlink control information.

The second downlink control information may include at least one of the carrier indicator field and the BWP indicator field (Embodiment 1).

In a case where the specific field indicates the special value, the control section 210 may consider that the configuration is to be deactivated. The specific field may include a frequency domain resource assignment field. The special value of the frequency domain resource assignment field may be based on a resource allocation type configured through higher layer signaling.

The second downlink control information need not include the carrier indicator field and the BWP indicator field. The control section 210 may consider that the configuration for all the cells that may be scheduled or all the BWPs that may be scheduled is to be deactivated (Embodiment 2).

The second downlink control information need not include the carrier indicator field and the BWP indicator field. The control section 210 may assume that the configuration is to be performed on at most one cell or at most one BWP (Embodiment 3).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
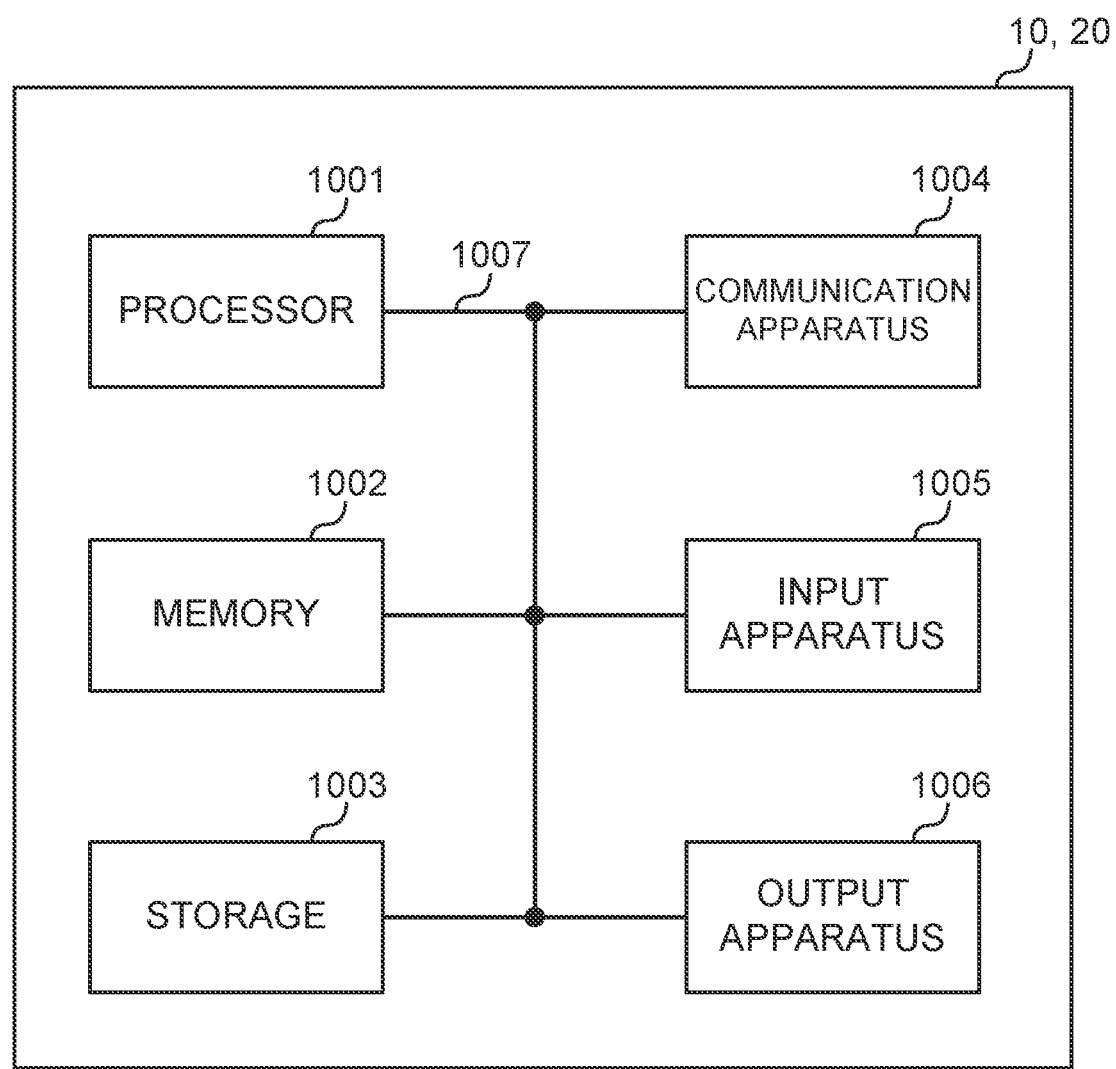
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an it apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing or data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220) and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

Variations

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one or a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mind-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mind-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead, of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. No to that the definition of TTIs is not limited to this.

TTI is may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)" a "PRE pair," an "RB pair" and so on.

Furthermore, a resource block may be constituted of one or a plurality of resource elements (REs). For example, one RE may correspond to a radio resource field of one subcarrier and one symbol.

A bandwidth part (BWP)) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station OAS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an unlink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and is various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver that receives, in a first cell, first downlink control information indicating that one of a configuration for downlink semi-persistent scheduling (DL SPS) in a first bandwidth part (BWP) of the first cell and a configuration for DL SPS in a second BWP of a second cell is activated, and receives, in the first cell, second downlink control information including at least one of a carrier indicator field and a BWP indicator field and including a frequency domain resource assignment field; and
   a processor that, when a value of the frequency domain resource assignment field included in the second downlink control information is a special value, determines that the configuration is deactivated,
   wherein the special value is based on a resource allocation type configured by higher layer signaling.

2. A radio communication method for a terminal, comprising:
   receiving, in a first cell, first downlink control information indicating that one of a configuration for downlink semi-persistent scheduling (DL SPS) in a first bandwidth part (BWP) of the first cell and a configuration for DL SPS in a second BWP of a second cell is activated, and receiving, in the first cell, second downlink control information including at least one of a carrier indicator field and a BWP indicator field and including a frequency domain resource assignment field; and
   when a value of the frequency domain resource assignment field included in the second downlink control information is a special value, determining that the configuration is deactivated,
   wherein the special value is based on a resource allocation type configured by higher layer signaling.

3. A base station comprising:
   a transmitter that transmits, in a first cell, first downlink control information indicating that one of a configuration for downlink semi-persistent scheduling (DL SPS) in a first bandwidth part (BWP) of the first cell and a configuration for DL SPS in a second BWP of a second cell is activated, and transmits, in the first cell, second downlink control information including at least one of a carrier indicator field and a BWP indicator field and including a frequency domain resource assignment field; and
   a processor that, when a value of the frequency domain resource assignment field included in the second downlink control information is a special value, deactivates the configuration,
   wherein the special value is based on a resource allocation type configured by higher layer signaling.

4. A system comprising a terminal and a base station, wherein
   the terminal comprises:
      a receiver that receives, in a first cell, first downlink control information indicating that one of a configuration for downlink semi-persistent scheduling (DL SPS) in a first bandwidth part (BWP) of the first cell and a configuration for DL SPS in a second BWP of a second cell is activated, and receives, in the first cell, second downlink control information including at least one of a carrier indicator field and a BWP indicator field and including a frequency domain resource assignment field; and
      a processor that, when a value of the frequency domain resource assignment field included in the second downlink control information is a special value, determines that the configuration is deactivated,
      wherein the special value is based on a resource allocation type configured by higher layer signaling, and
   the base station comprises:
      a transmitter that transmits the first downlink control information and the second downlink control information; and
      a processor that, when the value of the frequency domain resource assignment field is the special value, deactivates the configuration.

* * * * *